Aug. 24, 1948.  C. M. TERRY  2,447,920
FLOW-PROPORTIONING VALVE
Filed July 3, 1946
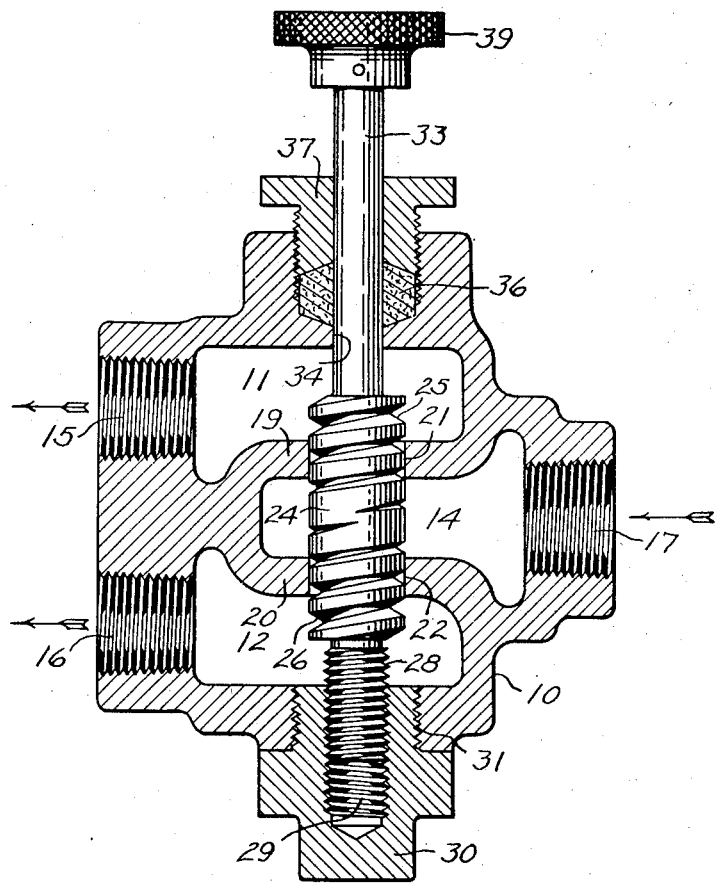
Inventor
CHARLES M. TERRY
By Albert G. Blodgett
Attorney Patented Aug. 24, 1948

2,447,920

UNITED STATES PATENT OFFICE 2,447,920

FLOW-PROPORTIONING VALVE

Charles M. Terry, Decatur, Ill., assignor to A. W. Cash Company, Decatur, Ill., a corporation of Delaware Application July 3, 1946, Serial No. 681,343

7 Claims. (Cl. 138—43)

This invention relates to flow-proportioning valves, and more particularly to valves suitable for dividing a single main stream of fluid into two branch streams in desired proportions, or for combining two branch streams in desired proportions into a single main stream.

It is one object of the invention to provide a flow-proportioning valve of simple and inexpensive construction which can be readily adjusted to vary the proportional flow in a desired manner.

It is a further object of the invention to provide a flow-proportioning valve having an adjustable valve member so constructed and arranged that considerable movement of the valve member will be required to produce relatively small changes in the proportional flow, whereby the proportional flow may be adjusted with great accuracy.

It is a further object of the invention to provide a flow-proportioning valve which will be thoroughly dependable in operation and comparatively unlikely to become obstructed by particles of solid matter carried in suspension by the fluid.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, the single figure is a longitudinal section taken through the center of a flow-proportioning valve.

The embodiment illustrated comprises a hollow casing or body 10 shaped to provide two spaced end chambers 11 and 12, and a central or intermediate chamber 14 between the end chambers. Screw-threaded openings 15, 16 and 17 communicate with the respective chambers 11, 12 and 14, for convenience in connecting pipes thereto. A partition wall 19 separates the chambers 11 and 14, and a partition wall 20 separates the chambers 12 and 14. The walls 19 and 20 are provided with cylindrical ports or openings 21 and 22 respectively therethrough, these openings being axially aligned and preferably of the same diameter.

A valve member 24 extends through the openings 21 and 22 to control the proportional flow. This member is in the form of a cylinder having a diameter substantially equal to that of the openings. The portion of the cylinder 24 which extends through the opening 21 is provided with a helical groove 25, and the portion which extends through the opening 22 is provided with a helical groove 26, these grooves forming passages for the flow of fluid. The grooves are preferably of V-shape in cross section, and they taper in opposing directions so that by moving the valve member axially, the relative flow restriction at the respective openings 21 and 22 may be varied.

Preferably the taper of the helical grooves is such that the grooves increase in cross sectional area in the direction of flow. Thus in the embodiment illustrated the opening 17 is an inlet opening and the openings 15 and 16 are outlet openings, so that fluid flows from the central inlet chamber 14 into the outlet chambers 11 and 12 through the openings 21 and 22 respectively. With the flow as described, the grooves 25 and 26 are made with their least cross sectional area at their inner or adjacent ends, so that their area will increase in a direction toward the chambers 11 and 12 respectively. The increase in cross sectional area is brought about by increasing both the depth and the width of the groove, and to facilitate manufacture the lead of the helix is maintained constant throughout its length. This will make it possible to form the groove in an ordinary thread-cutting lathe or similar machine tool in a very simple manner.

The valve member 24 is adjustable axially, and for this purpose a threaded stud 28 is provided on the lower end thereof. This stud engages a threaded hole 29 in a plug 30, this plug being mounted in a threaded hole 31 in the casing 10. A valve stem 33 is provided on the upper end of the member 24 in axial alignment therewith, this stem extending upwardly through a hole 34 in the casing. This hole is counterbored to receive packing material 36 and a gland 37 to provide a stuffing box and prevent leakage of fluid around the stem. A handle 39 is secured to the upper end of the valve stem.

The operation of the invention will now be apparent from the above disclosure. Fluid will enter the central chamber 14 through the inlet 17 and flow through the openings 21 and 22 into the end chambers 11 and 12 respectively, and thence through the respective outlets 15 and 16. In passing through the opening 21 the fluid is compelled to travel along the groove 25, and in passing through the opening 22 the fluid necessarily flows along the groove 26. If the valve member 24 is in its mid-position as illustrated, the two grooves will provide equal resistances, so that the flow may be equally divided. By turning the handle 39, the operator can shift the valve member axially, since the stud 28 by its engagement with the threaded hole 29 will bring about such axial movement. This will increase the resistance to flow through one of the openings 21—22 while decreasing the resistance to flow through the other opening, since the two grooves 25—26 taper in opposite directions, and in this manner the flow may be divided in any desired proportion. If a particle of solid matter should enter one of the grooves, it will tend to free itself rather than to become wedged in the groove, since both grooves increase in cross sectional area in the direction of flow. Obviously, the valve may be employed without any change to combine two fluids in desired proportions, the fluids being supplied to the openings 15 and 16 respectively and the mixture escaping through the opening 17. In such case it would be preferable, although not essential, to reverse the direction of taper of the grooves 25—26 in order to minimize the possibility of plugging the grooves.

The valve is very simple and inexpensive to manufacture, and it makes possible a very accurate adjustment in proportional flow. One complete turn of the handle 39 will shift the valve member 24 axially only a distance equal to the lead of the thread on the stud 28, and because of the gradual taper of the helical grooves this will effect only a relatively small change in the relative flow resistances at the openings 21—22. Consequently very fine adjustments are readily made.

Having thus described my invention, what I claim as new and desire to secure by Letters Patent is:

1. A flow-proportioning valve comprising a hollow casing shaped to provide two spaced end chambers and an intermediate chamber between the end chambers, the casing including two partition walls separating the intermediate chamber from the respective end chambers, the two walls having aligned cylindrical openings therethrough, a valve member extending through the openings and having cylindrical portions which fit the openings closely, each of the said cylindrical portions having a helical groove extending therearound to form a passage for fluid flow, the two grooves tapering in opposing direction to provide gradually changing cross sectional areas along their lengths, and means to shift the valve member axially and thereby adjust the relative resistance to flow through the respective openings.

2. A flow-proportioning valve comprising a hollow casing shaped to provide two spaced end chambers and an intermediate chamber between the end chambers, the casing including two partition walls separating the intermediate chamber from the respective end chambers, the two walls having aligned cylindrical openings therethrough, a valve member extending through the openings and having cylindrical portions which fit the openings closely, each of the said cylindrical portions having a helical groove extending therearound to form a passage for fluid flow, the two grooves tapering in opposing directions to provide gradually changing cross sectional areas along their lengths, means providing a threaded opening adjacent one end of the valve member, a threaded stud projecting axially from the valve member into engagement with the said threaded opening, and means to turn the valve member about its axis and thus shift the valve member axially, thereby adjusting the relative resistance to flow through the respective cylindrical openings.

3. A flow-proportioning valve comprising a hollow casing shaped to provide two spaced end chambers and an intermediate chamber between the end chambers, the casing including two partition walls separating the intermediate chamber from the respective end chambers, the two walls having aligned cylindrical openings therethrough, a valve member extending through the openings and having cylindrical portions which fit the openings closely, each of the said cylindrical portions having a helical groove extending therearound to form a passage for fluid flow, the two grooves tapering in opposing directions to provide gradually changing cross sectional areas along their lengths, means providing a threaded opening adjacent one end of the valve member, a threaded stud projecting axially from the valve member into engagement with the said threaded opening, a stem projecting axially from the other end of the valve member and outwardly through the casing wall, and a handle on the outer end of the stem to turn the valve member and thus shift the same axially, thereby adjusting the relative resistance to flow through the respective cylindrical openings.

4. A flow-proportioning valve comprising a hollow casing shaped to provide two spaced end chambers and an intermediate chamber between the end chambers, the casing including two partition walls separating the intermediate chamber from the respective end chambers, the two walls having aligned cylindrical openings therethrough of equal diameters, a valve member extending through the openings and having cylindrical portions of equal diameters which fit the openings closely, each of the said cylindrical portions having a helical groove extending therearound to form a passage for fluid flow, the two grooves tapering in opposing directions to provide gradually changing cross sectional areas along their lengths, and means to shift the valve member axially and thereby adjust the relative resistance to flow through the respective openings.

5. A flow-proportioning valve comprising a hollow casing shaped to provide two spaced end chambers and an intermediate chamber between the end chambers, the casing including two partition walls separating the intermediate chamber from the respective end chambers, the two walls having aligned cylindrical openings therethrough, a valve member extending through the openings and having cylindrical portions which fit the openings closely, each of the said cylindrical portions having a helical groove extending therearound to form a passage for fluid flow, each groove extending along a helix of constant lead, the depth of one groove increasing gradually in one direction and the depth of the other groove increasing gradually in the other direction, and means to shift the valve member axially and thereby adjust the relative resistance to flow through the respective openings.

6. A flow-proportioning valve comprising a hollow casing shaped to provide two spaced end chambers and an intermediate chamber between the end chambers, the casing including two partition walls separating the intermediate chamber from the respective end chambers, the two walls having aligned cylindrical openings therethrough, a valve member extending through the openings and having cylindrical portions which fit the openings closely, each of the said cylindrical portions having a helical groove extending therearound to form a passage for fluid flow, each groove tapering along its length to provide a cross sectional area which increases gradually in the direction of flow, and means to shift the valve member axially and thereby adjust the relative resistance to flow through the respective openings.

7. A flow-proportioning valve comprising a hollow casing shaped to provide two spaced outlet chambers and an inlet chamber between the outlet chambers, the casing including two partition walls separating the inlet chamber from the respective outlet chambers, the two walls having aligned cylindrical openings therethrough, a valve member extending through the openings and having cylindrical portions which fit the openings closely, each of the said cylindrical portions having a helical groove extending therearound to form a passage for fluid flow from the inlet chamber to the corresponding outlet chamber, each groove tapering to provide a cross sectional area which increases gradually in the direction of flow, and means to shift the valve member axially and thereby adjust the relative resistance to flow through the respective openings.

CHARLES M. TERRY.

REFERENCES CITED

The following references are of record in the file of this patent:

UNITED STATES PATENTS

| Number | Name | Date |
|---|---|---|
| 122,427 | Barnett et al. | Jan. 2, 1872 |